US009046953B2

(12) United States Patent
Hung et al.

(10) Patent No.: US 9,046,953 B2
(45) Date of Patent: Jun. 2, 2015

(54) CONTROL SYSTEM FOR TOUCH SCREEN

(71) Applicant: MStar Semiconductor, Inc., Hsinchu County (TW)

(72) Inventors: Guo-Kiang Hung, Hsinchu Hsien (TW); Chien Chuan Chen, Hsinchu Hsien (TW); Chi Kang Liu, Hsinchu Hsien (TW)

(73) Assignee: MSTAR SEMICONDUCTOR, INC, Hsinchu County (TW)

( * ) Notice: Subject to any disclaimer, the term of this patent is extended or adjusted under 35 U.S.C. 154(b) by 59 days.

(21) Appl. No.: 13/845,198

(22) Filed: Mar. 18, 2013

(65) Prior Publication Data

US 2013/0241858 A1 Sep. 19, 2013

(30) Foreign Application Priority Data

Mar. 19, 2012 (TW) .............................. 101109372 A

(51) Int. Cl.
*G06F 3/041* (2006.01)
*G06F 1/26* (2006.01)
*G06F 3/044* (2006.01)

(52) U.S. Cl.
CPC ................ *G06F 3/0412* (2013.01); *G06F 1/26* (2013.01); *G06F 3/0416* (2013.01); *G06F 3/044* (2013.01)

(58) Field of Classification Search
CPC ........... G06F 1/26; G06F 3/041; G06F 3/044; G06F 3/0412; G06F 3/0416; G06F 3/0418; G09G 2320/0209
USPC ...................... 345/173–179; 178/18.01–19.07
See application file for complete search history.

(56) References Cited

U.S. PATENT DOCUMENTS

| 2007/0182719 | A1* | 8/2007 | Lee et al. ....................... 345/173 |
| 2007/0262966 | A1* | 11/2007 | Nishimura et al. ............ 345/173 |
| 2008/0278451 | A1* | 11/2008 | Lee ................................. 345/173 |
| 2009/0146964 | A1* | 6/2009 | Park et al. ...................... 345/173 |
| 2009/0167718 | A1* | 7/2009 | Lee et al. ....................... 345/174 |
| 2010/0110040 | A1* | 5/2010 | Kim et al. ...................... 345/174 |
| 2011/0210940 | A1* | 9/2011 | Reynolds ....................... 345/174 |
| 2011/0210941 | A1* | 9/2011 | Reynolds et al. .............. 345/174 |
| 2011/0242050 | A1* | 10/2011 | Byun et al. ..................... 345/174 |
| 2012/0081320 | A1* | 4/2012 | Hwang et al. ................. 345/173 |

* cited by examiner

*Primary Examiner* — Lun-Yi Lao
*Assistant Examiner* — Elliott Deaderick
(74) *Attorney, Agent, or Firm* — WPAT, PC; Justin King

(57) ABSTRACT

A control system for a touch screen is provided. The control system includes a voltage-level shifter between a screen controller and a touch controller. The voltage-level shifter level-shifts a common voltage for driving the screen to a corresponding timing signal with an input signal range acceptable by the touch controller.

12 Claims, 3 Drawing Sheets

CONTROL SYSTEM FOR TOUCH SCREEN

This application claims the benefit of Taiwan application Serial No. 101109372, filed Mar. 19, 2012, the disclosure of which is incorporated by reference herein in its entirety.

BACKGROUND

1. Technical Field

The disclosure relates in general to a control system for a touch screen, and more particularly to a control system that, by utilizing a voltage-level shifter, converts a common voltage for driving a screen to a timing signal acceptable by a touch controller and accordingly controls a touch sensing timing.

2. Description of the Related Art

A touch screen combining touch sensing of a touch sensor and a display function of a screen provides a user-friendly and intuitive control interface, and is one of the most prevalent human-machine interfaces in the modern world.

FIG. 1 shows a sectional view of a conventional touch screen 10. The touch screen 10 engages a touch sensor 12 and a screen 14 via an adhesive layer ADVp. The touch sensor 12 includes a cover lens layer CLp, an adhesive layer OCAp, an electrode layer ITO_SRp, an isolating layer PET1$p$, an electrode layer ITO_SLD and an isolating layer PET2$p$. For example, the cover lens layer CLp is made of glass or acrylic, the adhesive layer OCAp is an optically clear adhesive layer, the electrode layers ITO_SRp and ITO_SLD are conductive layers formed from indium tin oxide (ITO), and the isolating layers PET1$p$ and PET2$p$ are non-conductive isolating layers formed by polyester films. The electrode layer ITO_SRp includes a plurality of sensing electrodes. When touch control occurs on the cover lens layer CLp, the sensing electrodes distributed at different positions are respectively coupled to capacitance changes in different values. Thus, a touch position can be determined according to the positions of the sensing electrodes and the capacitance changes coupled to the sensing electrodes.

For example, the screen 14 is a liquid crystal display (LCD) panel including an upper glass substrate TG, an electrode layer ITO_VCOMp and a liquid crystal structure LCSp. The electrode layer ITO_VCOMp is a conductive layer formed by ITO. The liquid crystal structure LCSp includes pixel electrodes in a matrix arrangement in another ITO electrode layer (not shown). Each of the pixel electrodes forms a pixel with a thin-film transistor (not shown), while liquid crystal is filled between the pixel electrodes and the electrode layer ITO_VCOMp. The electrode layer ITO_VCOMp extends along a planar direction of the screen 14 to cover the pixel electrodes of the screen to conduct a common voltage. Under the control of a gate voltage, the thin-film transistors conduct a source voltage to the corresponding pixel electrodes. Therefore, in the pixels, the source voltage conducted with the pixel electrodes drives the crystal liquid filled between the pixel electrodes and the electrode layer ITO_VCOMp together with the common voltage present on the electrode layer ITO_VCOMp to change a status of the liquid crystal. For example, an arrangement direction and thus a transparency of the liquid crystal is changed, allowing the pixels to present an image having different and distinct brightness and color.

As the liquid crystal is driven by a constant-polarity voltage in the long term, particle characteristics of the liquid crystals can be damaged to result in a residual image on the screen. To prevent the residual image, the common voltage transmitted on the electrode layer ITO_VCOMp periodically switches to different levels to perform polarity inversion.

Since the touch sensor 12 is very much alike like the electrode layer ITO_VCOMp in the screen 14 and the electrode layer ITO_VCOMp has a substantial area, the conventional touch sensor 12 is required to be provided with a shielding electrode layer ITO_SLD, so as to prevent transition of the common voltage to be coupled to the sensing electrodes of the electrode layer ITO_SRp. In the absence of the electrode ITO_SLD, the transient state triggered by the transition of the common voltage shall be coupled to the sensing electrodes of the electrode layer ITO_SRp to undesirably affect touch sensing.

SUMMARY

The present invention discloses a control system for a touch screen including a screen and a touch sensor. The control system includes a screen controller, a voltage-level shifter and a touch controller. The screen controller generates a common voltage which drives the screen and varies within a first signal range. The voltage-level shifter has an input terminal and an output terminal. The output terminal of the voltage-level shifter is coupled to the common voltage to allow the voltage-level shifter to provide a timing signal at the output terminal according to the common voltage. The timing signal varies within a second signal range different from the first signal range. The touch controller is coupled to the output terminal and controls the touch sensor according to the timing signal.

Preferably, the voltage-level shifter includes an alternating-current (AC) coupling circuit and a level adjuster. The AC coupling circuit, coupled between the input terminal and the output terminal of the voltage-level shifter, filters out a direct-current (DC) component in the common voltage, and reflects a filtered result at the output terminal. The level adjuster, coupled to the output terminal, controls the second signal range of the timing signal.

Preferably, the AC coupling circuit includes a capacitor coupled between the input terminal and the output terminal of the voltage-level shifter.

Preferably, the level adjuster includes a first resistor and a second resistor. The first resistor has two terminals respectively coupled to a first operating voltage (e.g., a positive voltage) and the output terminal of the voltage-level shifter. The second resistor has two terminals respectively coupled to the output terminal of the voltage-level shifter and a second operating voltage (e.g., a ground voltage). The AC coupling circuit filters out the DC component in the common voltage, and reflects the filtered result at the output terminal. The first resistor and the second resistor divide the voltage between the first operating voltage and the second operating voltage. A DC voltage established from the voltage dividing is loaded on the filtered result at the output terminal to provide another DC component to the DC-component-removed common voltage to become the timing signal.

Preferably, the level adjuster includes a resistor and a diode. The resistor is coupled between the second operating voltage and the output terminal. The second diode has an anode and a cathode respectively coupled to the second operating voltage and the output terminal. When the DC-component-removed common voltage is reflected at the output terminal, an upper limit of the second signal range of the timing signal is established by the second operating voltage plus a resistor cross voltage, and a lower limit of the second signal range of the timing signal is established by the second operating voltage minus a forward bias between the anode and the cathode of the diode.

Preferably, the level adjuster in the voltage-level shifter and the touch controlled are packaged in a same chip, the screen controller is packaged in another chip, and the AC coupling circuit in the voltage-level shifter is coupled between the two chips. Alternatively, the touch controller and the screen controller are two different chips, and the voltage-level shifter is coupled between the two chips.

Preferably, the touch controller includes a converter and a sensing timing circuit. The converter, coupled to the output terminal of the voltage-level shifter, provides a digital indication signal according to the timing signal. The sensing timing circuit, coupled to the converter, provides a gate control signal according to the indication signal. The gate control signal includes a plurality of non-sensing periods and a plurality of sensing periods. The non-sensing periods cover the transitions of the indication signal, while the indication signal is maintained at a steady state in the sensing periods. Thus, the touch controller controls the touch sensor according to the gate control signal to prevent interferences of the transition of the common voltage. For example, the touch controller stops sensing in the non-sensing periods, and/or discards sensing results of the non-sensing periods.

Figure 2:
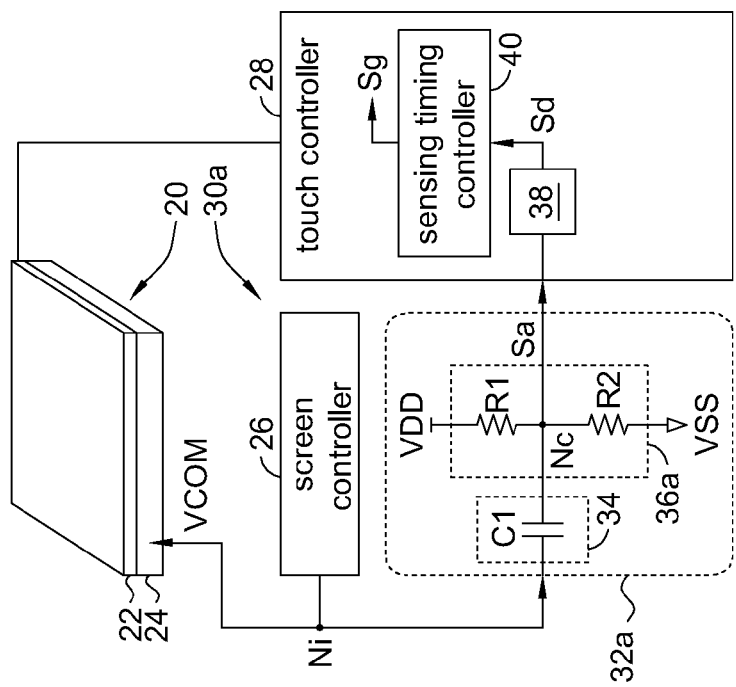
FIG. 2 is a schematic diagram of a control system and a touch screen according to one embodiment of the present invention.
Figure 1:
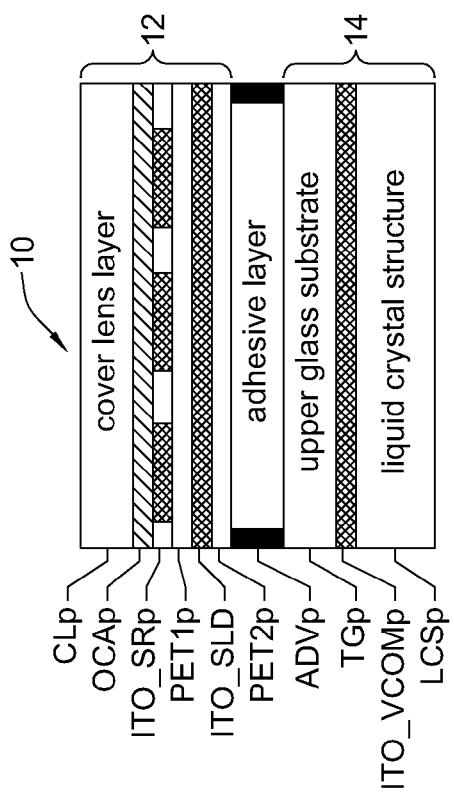
FIG. 1 is a conventional touch screen.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 2 shows a schematic diagram of a control system 30a accompanying with a touch screen 20 according to one embodiment of the present invention. The touch screen 20 includes a screen 24 and a touch sensor 22. The control system 30a includes a screen controller 26, a voltage-level shifter 32a and a touch controller 28. The screen controller 26 provides a common voltage VCOM for driving the screen 24. Nodes Ni and Nc of the voltage-level shifter 32a are respectively regarded as an input terminal and an output terminal of the voltage-level shifter 32a. The input terminal is coupled to the common voltage VCOM at the node Ni to allow the voltage-level shifter 32a to provide a corresponding timing signal Sa at the output terminal at the node Nc according to the common voltage VCOM. The touch controller 28 is coupled to the node Nc, and controls the touch sensor 22 according to the timing signal Sa.

In this embodiment, the voltage-level shifter 32a includes an alternating-current (AC) coupling circuit 34 and a level adjuster 36a. The AC coupling circuit 34 includes a capacitor C1 coupled between the nodes Ni and Nc. The capacitor C1 of the AC coupling circuit 34 filters and removes a direct-current (DC) component in the common voltage VCOM, and reflects a filtered result at the node Nc. The level adjuster 36a is coupled to the node Nc, and controls a signal range of the timing signal Sa. The level adjuster 36a includes two resistors R1 and R2. The resistor R1 has two terminals respectively coupled to an operating voltage VDD, e.g., a positive voltage, and the node Nc. The resistor R2 has two terminals respectively coupled to the node Nc and another operating voltage VSS, e.g., a ground voltage. For example, the operating voltages VDD and VSS are DC operating voltages of the touch sensor 28.

Figure 3:
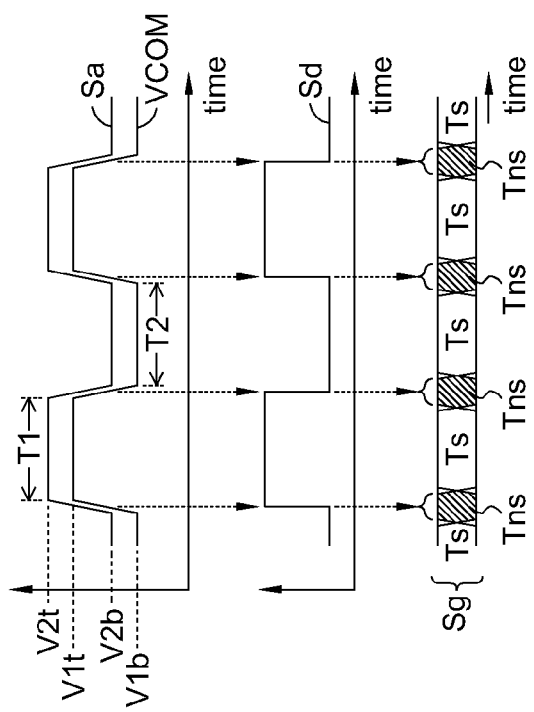
FIG. 3 is an operating timing diagram of the control system in FIG. 2

FIG. 3 shows operating timing waveforms of the voltage-level shifter 32a and the touch controller 28. A horizontal axis in the waveforms represents time. To invert a driving polarity, the common voltage VCOM switches between a level V1$t$ and a level V1$b$, so that a peak-to-peak signal range of the common voltage VCOM is between the levels V1$t$ and V1$b$. Since the common voltage VCOM is for driving the screen 24, the signal range is determined by characteristics of the screen 24. For example, the level V1$t$ as an upper limit of the signal range is 4V, and the level V1$b$ as a lower limit is −1V. When the common voltage VCOM switches from the level V1$b$ to the level V1$t$, a rising-edge transient occurs. When the common voltage VCOM switches from the level V1$t$ to the level V1$b$, a falling-edge transient occurs. Both the rising-edge and falling-edge transients interfere in the touch sensing of the touch sensor 22. Preferably, the touch sensing mechanism avoids the transition of the common voltage VCOM according to a change in the common voltage VCOM. However, the signal range of the common voltage VCOM is tailored for requirements of the screen 24, and does not satisfy a rated input signal range acceptable by the touch controller 28. In this embodiment, the voltage-level shifter 32a converts the common voltage VCOM to the timing signal Sa acceptable by the touch controller 28.

In the voltage-level shifter 32a, the AC coupling circuit 34 filters out the DC component in the common voltage VCOM and reflects the filtered result at the node Nc, and the resistors R1 and R2 perform voltage dividing between the operating voltages VDD and VSS. As shown in FIG. 3, the upper and lower limits of the signal range of the timing signal Sa are respectively adjusted to levels V2$t$ and V2$b$ by the voltage-level shifter 32a. The levels V2$t$ and V2$b$ fall within the rated input signal range of the touch controller 28, so that the timing signal Sa can be accepted by the touch controller 28. Further, the transition of the timing signal Sa still follows the transition of the common voltage VCOM, so that the touch controller 28 is allowed to control the touch sensing according to the timing signal Sa.

In this embodiment, values of the resistors R1 and R2 are designed according to the rated input signal range defined by specifications of the touch controller 28, such that the levels V2$t$ and V2$b$ fall within the rated input signal range, e.g., between 0V to 5V. For example, assuming a period in which the common voltage VCOM is maintained at the level V1$t$ is a period T1 and a period in which the common voltage VCOM is maintained at the level V1$b$ is a period T2, the level V2$t$=V1$t$−Vdc+Vdiv and V2$b$=V1$b$−Vdc+Vdiv; where Vdc= (T1*V1$t$+T2*V1$b$)/(T1+T2) represents the DC component in the common voltage VCOM, and Vdiv=(VDD*R2+ VSS*R1)/(R1+R2) represents the DC voltage established by the voltage dividing of the level adjuster 36a.

The touch controller 28 includes a converter 38 and a sensing timing circuit 40. The converter 38 is coupled to the node Nc of the voltage-level shifter 32a, and provides a digital indication signal Sd according to the timing signal Sa. For example, the converter 38 is a comparator. When the timing signal Sa is greater than a predetermined value, the indication signal reflects a logic 1, and when the timing signal is smaller than the predetermined value, the indication signal reflects a logic 0. Alternatively, the converter 38 is a Schmitt trigger. The sensing timing circuit 40, coupled to the converter 38, receives the indication signal Sd and provides a gate control signal Sg according to the indication signal Sd. The gate control signal Sg includes a plurality of non-sensing periods Tns and a plurality of sensing periods Ts. The non-sensing periods Tns cover the transitions in the indication signal Sd, as well as the timing signal Sa and the common voltage VCOM. In the sensing periods Ts, the indication signal Sd/the timing signal Sa/the common voltage VCOM are maintained at a steady state. The non-sensing periods Tns cover sensing-interference-prone periods before and after the transition, and the non-sensing periods avoid the sensing periods. Thus, the touch controller 28 controls the touch sensor 22 according to the gate control signal Sg to prevent interferences of the transition of the common voltage VCOM. For example, the touch controller 28 stops sensing in the non-sensing periods Tns, and/or discards sensing results of the non-sensing periods Tns.

Figure 4:
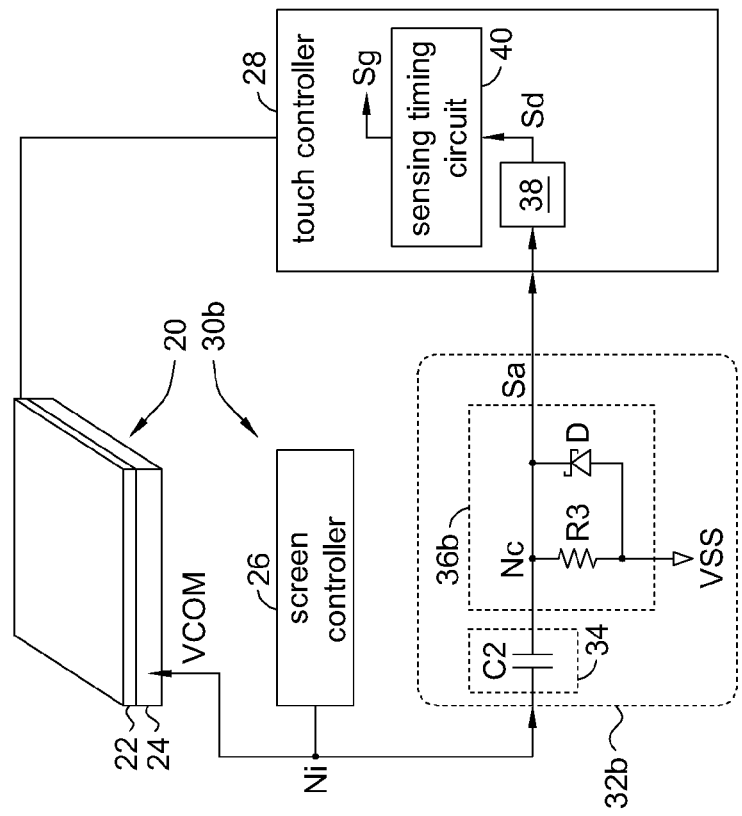
FIG. 4 is a schematic diagram of a control system according to an alternative embodiment of the present invention.

FIG. 4 shows a control system 30b according to another embodiment of the present invention. The control system 30b is applied to the touch screen 20. The screen controller 26 controls the screen 24 in the touch screen 20, and the touch controller 28 controls the touch sensor 22 in the touch screen 20. For example, the screen controller 26 provides the screen 24 with the common voltage VCOM and/or associated timing signals for controlling a gate voltage and a source voltage required by the screen 24. The touch controller 28 charges and discharges sensing electrodes (not shown) in the touch sensor 22 to detect capacitance changes coupled to the sensing electrodes according to charge variances.

The control system 30b includes a voltage-level shifter 32b for converting the common voltage VCOM at the node Ni (the input terminal) to the timing signal Sa at the node Nc (the output terminal). Thus, the transition of the timing signal Sa follows the transition of the common voltage VCOM, and allows the signal range of the timing signal Sa to satisfy the rated input signal range acceptable by the touch controller 28. The voltage-level shifter 32b includes an AC coupling circuit 34 and a level adjuster 36b. For example, the AC coupling circuit 34 is implemented by a capacitor C2. The level adjuster 36b includes a resistor R3 and a diode D, the resistor R3 is coupled between the operating voltage VSS and the node Nc, and the anode and the cathode of the diode D are respectively coupled to the operating voltage VSS and the node Nc.

Operation details of the voltage-level shifter 34b shall be described with reference to the timing waveforms in FIG. 3. The AC coupling circuit 34 filters out the DC component in the common voltage VCOM. When the DC-component-removed common voltage VCOM is reflected at the node Nc, in a period T1, the diode D is not conducted, and the level V2t as the upper limit of the signal range of the timing signal Sa is established by the operating voltage VSS plus the cross voltage of the resistor R3; in a period T2, the diode D is forward-biased and is conducted to the node Nc via the operating voltage VSS, and so the level V2b as the lower limit of the signal range of the timing signal Sa is the operating voltage VSS minus the forward bias between the anode and the cathode of the diode D. Therefore, the level V2b is lower than the operating voltage VSS. Preferably, for example, the diode is implemented by a Schottky diode. Since the forward bias of a Schottky diode is rather small (e.g., 0.2V), the lower limit of the level V2b is allowed to approximate the second operating voltage VSS and to be covered within the rated input signal range of the touch controller 28.

Figure 5:
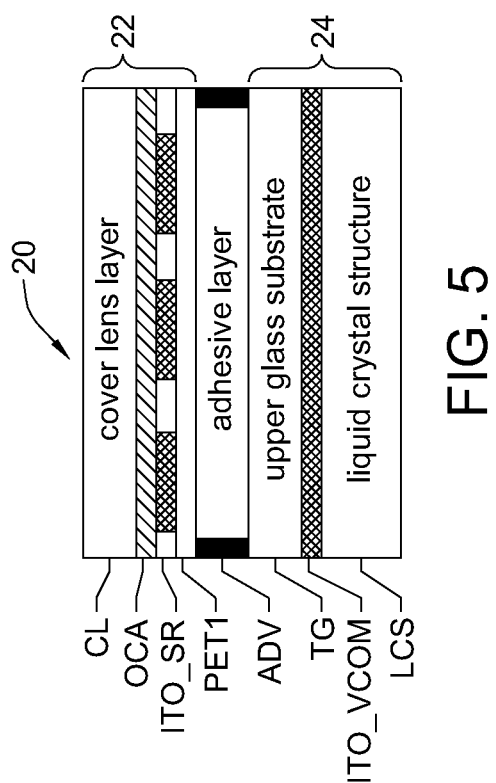
FIG. 5 is a schematic diagram of a touch screen according to one embodiment of the present invention.

As shown in FIGS. 2 and 4, the touch controller 28 is capable of avoiding the transition in the common voltage VCOM through the timing signal Sa obtained by voltage-level shifting the common voltage VCOM, so that the touch sensing stays unaffected from the transition of the common voltage VCOM. Preferably, an electrode layer for shielding is eliminated in the touch sensor of the touch screen. FIG. 5 shows the touch screen 20 according to one embodiment of the present invention. The touch screen 20 includes the touch sensor 22 engaged with the screen 24 via an adhesive layer ADV. For example, the touch sensor 22 is a capacitive touch sensor, and includes a cover lens layer LC, e.g., made of glass or acrylic, an adhesive layer OCA, e.g., an optically clear adhesive layer, an electrode layer ITO_SR, e.g., a conductive layer formed from ITO, and isolating layer PET1, e.g., a polyester film. Accordingly, the electrode layer for shielding can be eliminated. The electrode layer ITO_SR includes a plurality of sensing electrodes. When touch control is performed on the cover lens layer CL, the sensing electrodes distributed at different positions possesses coupling capacitance changes in different values. The touch controller 28 (e.g., in FIGS. 2 and 4) is coupled to the sensing electrodes, so as to detect the capacitance changes coupled to the sensing electrodes to determine the touch position.

For example, the screen 24 is an LCD panel including an upper glass substrate TG, an electrode layer ITO_VCOM and a liquid crystal structure LCS. The electrode layer ITO_VCOM is a conductive layer formed from ITO. The liquid crystal structure LCS includes pixel electrodes in a matrix arrangement in another ITO electrode layer (not shown). Each of the pixel electrodes jointly forms a pixel with a thin-film transistor (not shown). Further, liquid crystals are filled between the pixel electrodes and the electrode layer ITO_VCOM. The electrode layer ITO_VCOM extends along a planar direction of the screen 24 to cover the pixel electrodes of the screen 24 to conduct the common voltage VCOM. Under the control of the gate voltage, the thin-film transistors conduct the source voltage to the corresponding pixel electrodes. Therefore, in the pixels, the source voltage conducted with the pixel electrodes drives the crystal liquid filled between the pixel electrodes and the electrode layer ITO_VCOM together with the common voltage transmitted on the electrode layer ITO_VCOM to change a status of the liquid crystal. For example, an arrangement direction and thus a transparency of the liquid crystal is changed, allowing the pixels to present an image having different and distinct brightness and color.

In an alternative embodiment, the screen controller 26 and the touch controller 28 are realized as two different control chips. The voltage-level shifter 32a (32b) is disposed on the circuit board to be coupled between the screen controller 26 and the touch controller 28. In yet another embodiment, the screen controller 26 is packaged in a first chip, the voltage-level shifter 36a (36b) of the voltage-level shifter 32a (32b) and the touch controller 28 are packaged in a second chip, and the AC coupling circuit 34 is disposed on the printed circuit board. That is to say, the AC coupling circuit 34 is coupled to the voltage-level shifter 36a (36b) in the second chip via a pin of the second chip to realize the voltage-level shifter 32a (32b).

As illustrated with the foregoing embodiments, the present invention discloses disposing a voltage-level shifting circuit between the screen controller and the touch controller, so that the touch controller is allowed to eliminate interferences of the common voltage upon touch sensing by utilizing the common voltage signal of the screen controller without increasing pin-out. Thus, accuracy of the touch sensing is ensured, the structure of the touch screen is simplified for reducing costs of the touch screen, and the characteristics and performance as well as a yield of the touch screen are optimized.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A control system for a touch screen, the touch screen comprising a screen and a touch sensor, the control system comprising:
   a screen controller, for generating a common voltage to the screen, the common voltage varying within a first signal range;
   a voltage-level shifter, having an input terminal and an output terminal, the input terminal being coupled to the common voltage; the voltage-level shifter providing a timing signal at the output terminal according to the common voltage, the timing signal varying within a second signal range, the first signal range being different from the second signal range; and
   a touch controller, coupled to the output terminal, for controlling the touch sensor according to the timing signal;
   wherein said common voltage is directly coupled to an AC coupling circuit of said voltage-level shifter.

2. The control system according to claim 1, wherein the voltage-level shifter further comprises:
   an alternating-current (AC) coupling circuit, coupled between the input terminal and the output terminal, for filtering out a direct-current (DC) component in the common voltage; and
   a level adjuster, coupled to the output terminal, for adjusting the timing signal to the second signal range.

3. The control system according to claim 2, wherein the AC coupling circuit comprises a capacitor coupled between the input terminal and the output terminal.

4. The control system according to claim 2, wherein the level adjuster comprises:
   a first resistor, coupled between a first operating voltage and the output terminal; and
   a second resistor, coupled between the output terminal and a second operating voltage.

5. The control system according to claim 2, wherein the level adjuster comprises:
   a resistor, coupled between a predetermined operating voltage and the output terminal; and
   a diode, having an anode and a cathode respectively coupled to the predetermined operating voltage and the output terminal.

6. The control system according to claim 5, wherein the diode is a Schottky diode.

7. The control system according to claim 1, wherein the touch controller comprises:
   a converter, coupled to the output terminal, for generating an indication signal according to the timing signal; and
   a sensing timing circuit, coupled to the converter, for providing a gate control signal according to the indication signal, the gate control signal comprising a plurality of non-sensing periods and a plurality of sensing periods, the non-sensing periods covering a plurality of transitions of the indication signal, and the indication signal being maintained in a steady state in the sensing periods.

8. The control system according to claim 7, wherein the converter is a comparator.

9. The control system according to claim 7, wherein the converter is a Schmitt trigger.

10. The control system according to claim 1, wherein the touch screen contains no shielding layer.

11. The control system according to claim 1, wherein the screen controller is fabricated as a first integrated chip and the touch controller is fabricated as a second integrated chip.

12. The control system according to claim 1, wherein the AC coupling circuit comprises a first capacitor, and said first capacitor is directly coupled to the common voltage.

* * * * *